United States Patent [19]
Hughes

[11] Patent Number: 5,126,928
[45] Date of Patent: Jun. 30, 1992

[54] MOBILE BOOM-MOUNTED SHOP LIGHT

[76] Inventor: Charles Hughes, 6401 Crystal Valley Rd., Little Rock, Ark. 72210

[21] Appl. No.: 783,320

[22] Filed: Oct. 28, 1991

[51] Int. Cl.$^5$ .......................................... F21V 21/28
[52] U.S. Cl. .................................. 362/287; 362/419; 362/427; 248/122; 248/278
[58] Field of Search ............... 362/285, 287, 401, 413, 362/418, 419, 427; 248/122, 124, 278

[56] References Cited

U.S. PATENT DOCUMENTS

| | | | |
|---|---|---|---|
| 2,193,272 | 3/1940 | Crossley | 362/419 |
| 2,267,653 | 12/1941 | Hawkins | 362/413 |
| 2,366,950 | 1/1945 | Wright | 248/122 |
| 3,413,459 | 11/1968 | Sonneman | 362/401 |
| 4,773,621 | 9/1988 | Gebhardt | 248/122 |
| 4,803,606 | 2/1989 | Rotter | 362/413 |

Primary Examiner—Richard R. Cole
Attorney, Agent, or Firm—Ray F. Cox, Jr.

[57] ABSTRACT

The present invention relates to a mobile boom-mounted shop light, particularly adapted to use in connection with the maintenance and repair of all types of motor vehicles. The present invention provides for four separate degrees of freedom in positioning the light fixture by employing an articulated boom arrangement. The present invention comprises a mobile base, a vertical stand and a boom assembly comprising an arm, a light fixture and a counter weight. The boom assembly allows the light fixture to be rotated transversely about the upright longitudinal axis of the stand, to be rotated vertically, to be rotated about the axis of the boom assembly and to be pivoted from its position on the end of the boom assembly. The position of the light and boom assembly are fixed by a brake and friction plate mechanism.

4 Claims, 6 Drawing Sheets

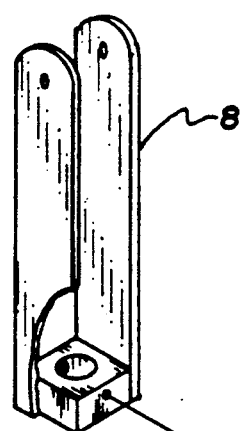
FIG. 6B
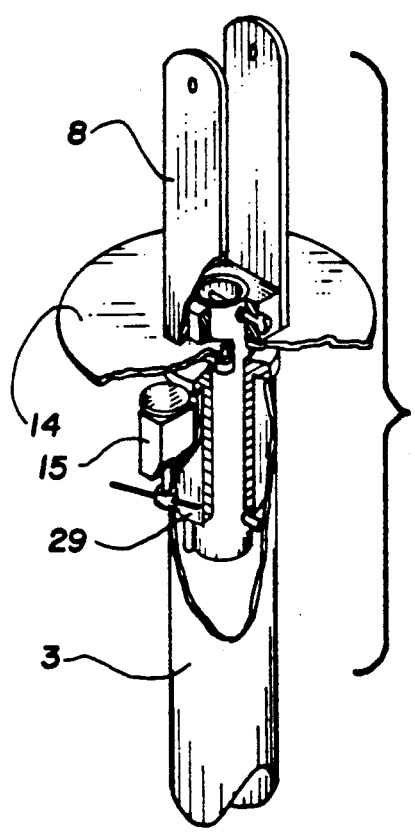
FIG. 6A
fig. 6b, above
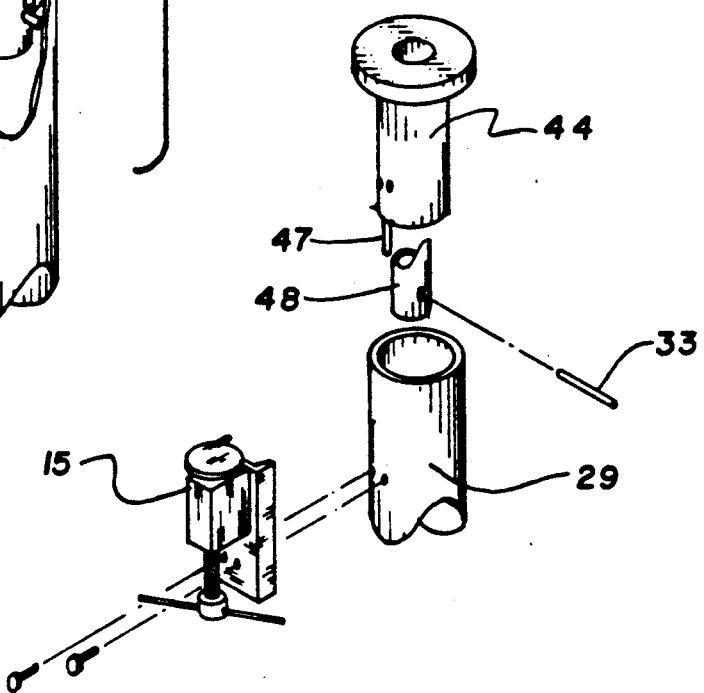

MOBILE BOOM-MOUNTED SHOP LIGHT

BACKGROUND OF THE INVENTION

1. Field of the Invention

The present invention relates to a mobile boom-mounted shop light particularly adapted to use in connection with the maintenance and repair of all types of motor vehicles.

2. Background Information

The maintenance and repair of motor vehicles requires the use of flexibly adaptable illumination. Proper illumination of a work area is necessary in all types of shop work and particularly in the maintenance and repair of all types of motor vehicles. The maintenance and repair of motor vehicles presents uniquely challenging problems in the provision of proper illumination due to the difficult and often impossible task of positioning the vehicle itself relative to adequate sources of illumination. Furthermore, the complexity of the machinery involved and the often tight quarters in which maintenance and repair work must be undertaken make the provisioning of illumination difficult. For example, a common problem requires illumination to be directed against the underside of a vehicle or a piece of machinery.

The commonly available form of illumination in the shop environment is the so-called "drop light." The limitations and problems inherent in the use of the "drop light" are well known.

An attempt to solve the problem of providing proper illumination of the work area for automotive vehicle maintenance and repair is given in Rotter, U.S. Pat. No. 4,803,606 issued Feb. 7, 1989. Rotter discloses a mobile universal shop light comprising a mobile lower stand, an upright bar and a light fixture provided with means to position the light fixture relative to the upright bar. While Rotter provides significant improvements over the "drop light," a number of shortcomings remain.

The mobile universal shop light disclosed in Rotter has limited degrees of adjustability. Since adjustability is provided through an arrangement of pins and matching holes, this arrangement allows only a limited number of angular orientations for the light fixture. Furthermore, this arrangement requires an undesirable degree of manual manipulation in order to alter the position of the light.

The mobile universal shop light disclosed in Rotter also lacks sufficient flexibility in the positioning of the light figure due to the limited number of degrees of freedom provided for the light fixture. The light fixture can only be rotated about its own axis and placed at a limited number of angular orientations relative to the upright stand. Furthermore, the disclosed arrangement virtually precludes placing the light fixture in such an orientation as to illuminate the underside of vehicles or machinery placed close to the floor.

SUMMARY OF THE INVENTION

The present invention solves these problems by providing for four separate degrees of freedom in positioning the light fixture. Furthermore, by employing an articulated boom arrangement, the present invention allows for greatly enhanced flexibility in positioning the light fixture into positions that would be difficult if not impossible to reach using any of the prior art techniques. Finally, the present invention provides for significantly enhanced ease in positioning the light fixture through the use of a brake and friction plate mechanism that does not require the significant degree of manual complexity found in the prior art.

Another aspect of the present invention is the design of a base portion which provides space for use as a tool caddy. In an additional aspect of the present invention, the light may be provided with a parts tray and an auxiliary electric power outlet.

BRIEF DESCRIPTION OF THE DRAWINGS

The present invention will be better understood through the following detailed description of the preferred embodiment in conjunction with the accompanying drawings.

FIG. 6A is a cutaway view of the rotatable sleeve which fits within the hollow upper section of the stand.

FIG. 6B is an exploded view of the same portion of the invention shown in FIG. 6A.

DESCRIPTION OF THE PREFERRED EMBODIMENT

Figure 1:
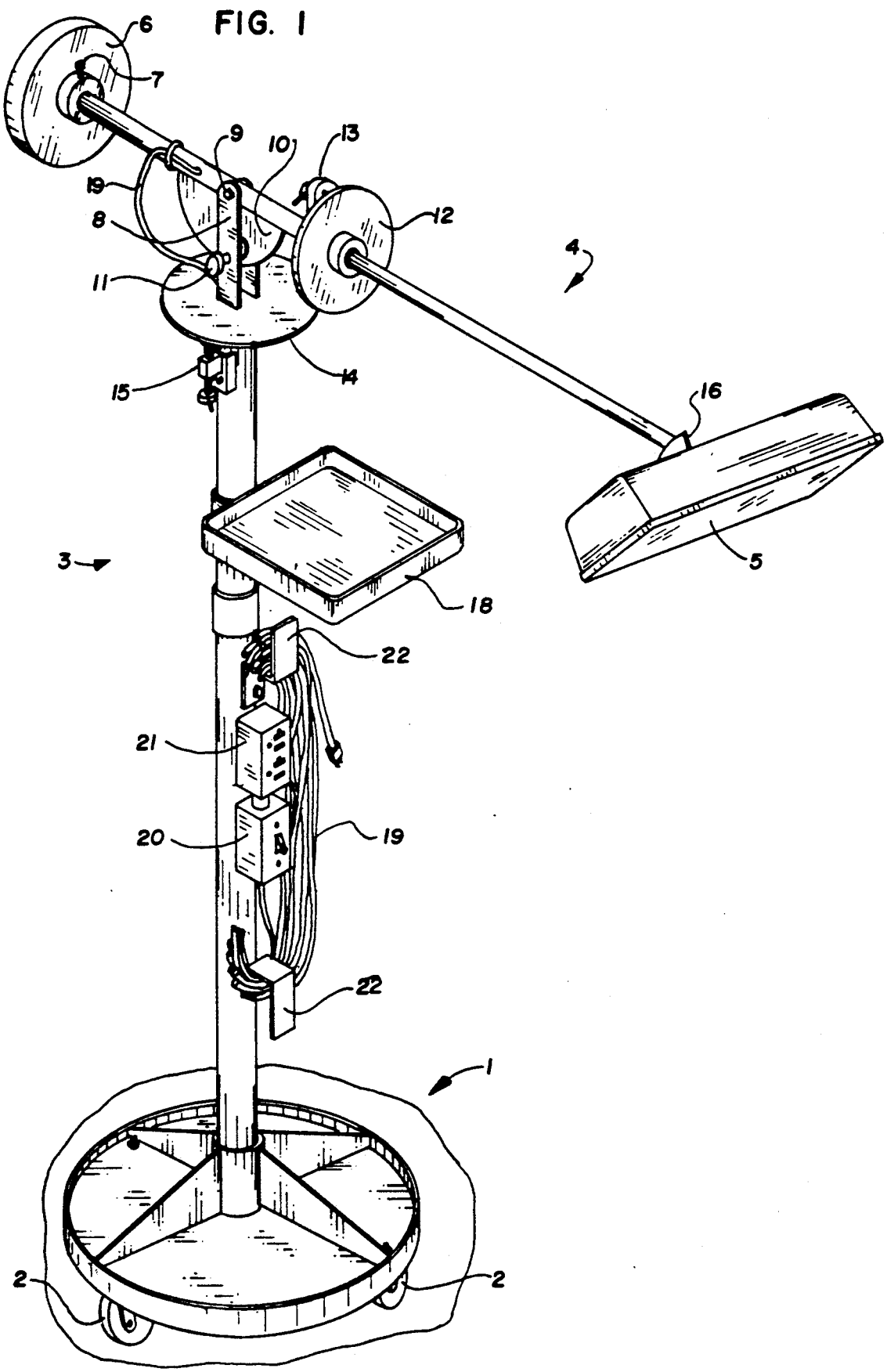
FIG. 1 is a perspective view of the overall invention.

FIG. 1 is an overall perspective view of the present invention. The base 1 is provided with a plurality of casters 2 for maximizing the mobility of the shop light. A stand 3 consisting of a hollow tube is rigidly affixed to the base 1 such that the stand 3 extends upward from the base 1 in a vertical direction. Affixed to the top of the stand 3 is a boom assembly designated generally as 4. To one end of the boom assembly 4 is affixed the light fixture 5. It is to be understood that varying types and designs of light fixtures could equally well be employed in the present invention and the description of one particular type of light fixture is not meant to limit the types of light fixtures that could be employed.

For maximum flexibility the boom assembly 4 should allow the light fixture 5 to be deployed in a number of configurations and positions. For maximum flexibility the light fixture 5 is mounted several feet away from the stand 3. Since the light fixture 5 represents a considerable bending moment, the light fixture 5 is balanced by a counterweight 6. In order to allow for proper balance of the boom assembly 4, the counterweight 6 is adjustably positional along the boom assembly 4. The counterweight 6 is fixed in position by a set screw 7. An upward facing U-bracket 8 is provided for the attachment of the boom assembly 4 to the stand 3. The boom assembly 4 is vertically rotatable around a pivot bolt 9 which is set horizontally through the U-bracket 8.

In order to provide for infinite adjustability for the boom assembly 4 relative to the stand 3 without requiring complex manipulations, a frictional braking mechanism is provided. A vertical friction plate 10 is rigidly affixed to the boom assembly 4. A vertical brake assembly 11, more fully described hereafter, provides for the application of a braking force to the vertical friction plate 10. Through this mechanism the boom assembly 4 may be repositioned with slight pressure anywhere along its length and having once been repositioned it will remain in that position due to the effect of static friction applied to the vertical friction plate 10 through the action of the vertical brake assembly 11.

An additional degree of freedom is provided for the boom assembly 4 to rotate transversely about the upright longitudinal axis of the stand 3. This degree of freedom is also controlled through the use of the friction plate and brake mechanism. A transverse friction plate 14 is rigidly affixed to the boom assembly 4. A transverse brake assembly 15 provides the appropriate degree of braking force against the transverse friction plate 14.

Likewise, a third degree of freedom is provided which allows for the rotation of the light fixture 5 around the longitudinal axis of the boom assembly 4. A rotational friction plate 12 and rotational brake assembly 13 is provided for this degree of freedom also. Furthermore, as will be detailed below, the light fixture 5 may be pivoted from its position on the end of the boom assembly 4 and for this degree of freedom, a separate friction plate and brake mechanism is provided.

The present invention is provided with a parts tray 18 which is affixed to the stand 3, a power switch 20, an electric cord 19, an auxiliary outlet 21 and brackets 22 which allow the electric cord to be conveniently stored while the shop light is being moved or when it is not in use.

Figure 2:
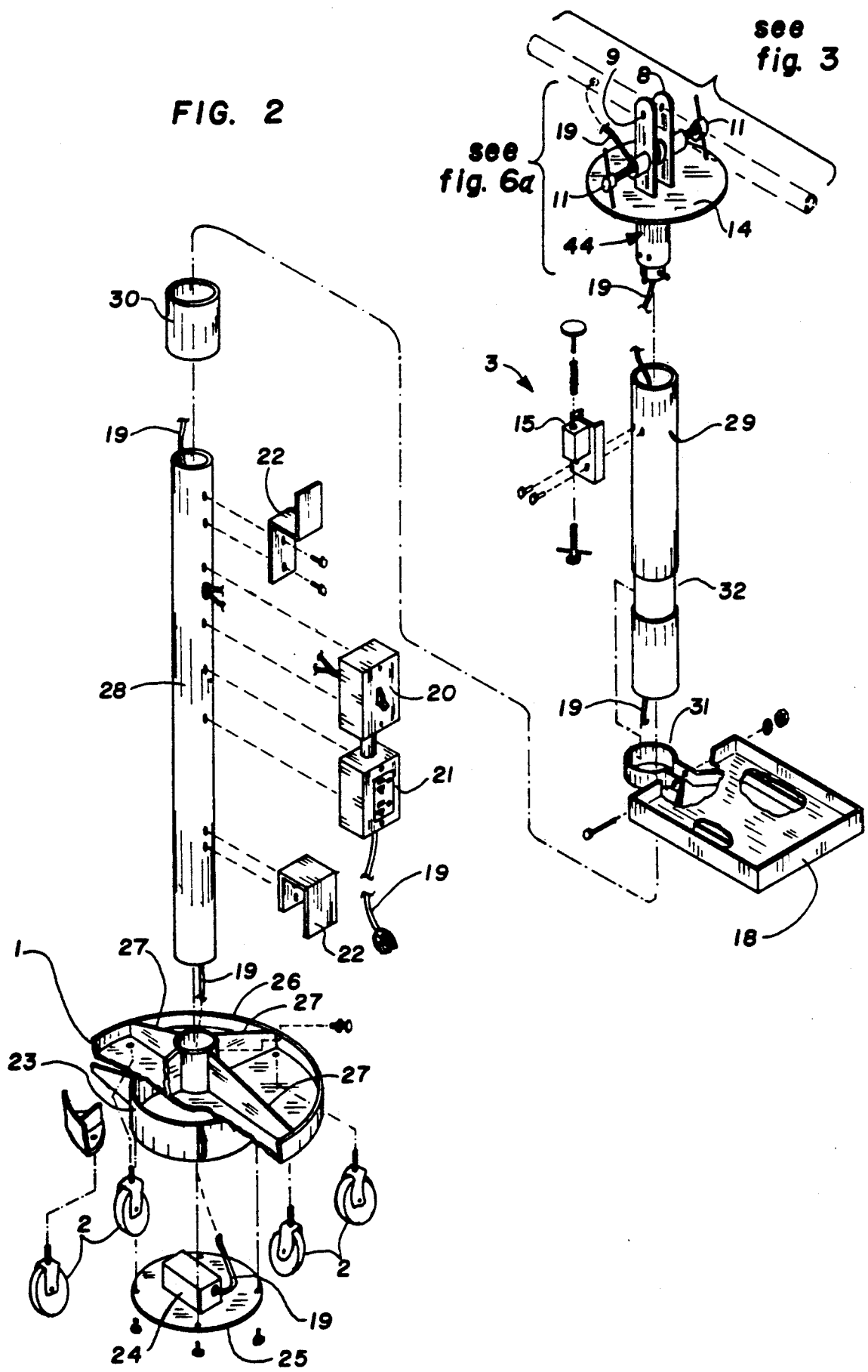
FIG. 2 is an exploded perspective view of the base and stand portion of the invention.

With reference to FIG. 2, the base 1 is shown in greater detail through the use of an exploded and partially cutaway view. Below the base 1 a ballast enclosure 23 is provided to store the ballast 24 for the light fixture 5. Access to the ballast 24 may be obtained through an access cover 25.

The base 1 is provided with a rim 26 which contributes to the strength and rigidity of the base 1 through its connection to support flanges 27. Furthermore, this design provides for a plurality of compartments defined by the rim 26 and the support flanges 27 to form a parts caddy with a plurality of compartments.

The stand 3 comprises a lower section 28 and upper section 29 of hollow tubing connected by a coupling flange 30. The hollow sections 28 and 29 provide a raceway for the power cord 19.

The upper section 29 of the stand 3 is provided with an annular recess 32. The parts tray 18 is attached to a bracket 31 which circles and nests in the annular recess 32 and is thereby both supported on the stand 3 and allowed to rotate about it.

With reference to FIGS. 6A and 6B, the boom assembly 4 is mated with the stand 3 through the mechanism of a bearing sleeve 44 which fits within the hollow upper section 29 of the stand 3. The bearing sleeve 44 is rigidly affixed to the hollow upper section 29. A rotatable inner sleeve 48 is rigidly affixed to the transverse friction plate 14 and the U-bracket 8. The rotatable inner sleeve 48 fits and turns freely within the bearing sleeve 48. The transverse brake assembly 15 is rigidly affixed to the upper section 29 of the stand 3 such that a adjustable braking force can be applied to the transverse friction plate 14. A transverse travel stop 33 is provided for to limit the rotation of the boom assembly to no more than 360°. This is necessary to prevent twisting of the power cord 19. The travel stop 33 is rigidly affixed to the rotatable inner sleeve 48. A projection 47 rigidly affixed to the bearing sleeve 44 extends downward. The projection 47 encounters the travel stop 33 and further motion is prevented thereby.

Figure 3:
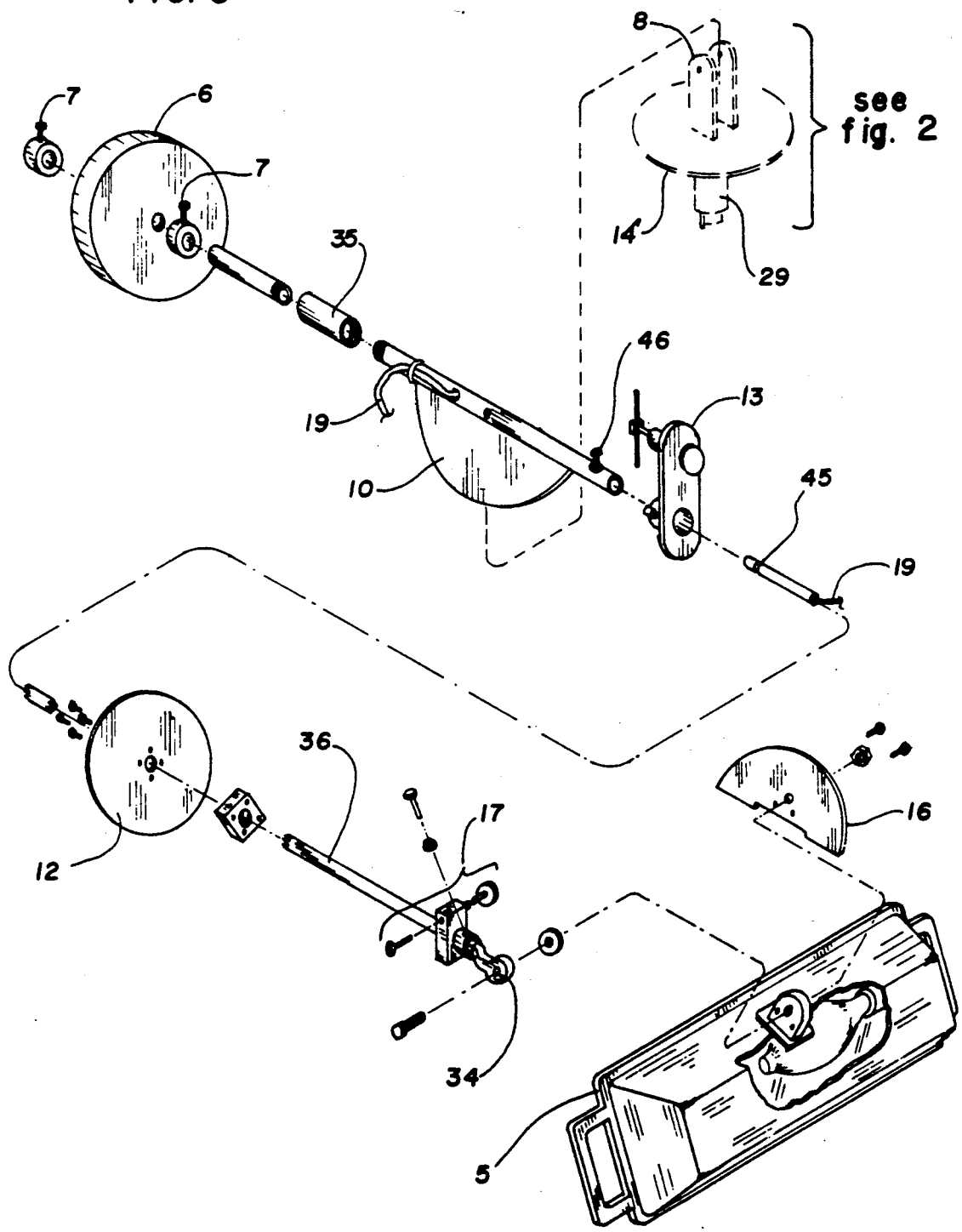
FIG. 3 is an exploded view of the boom assembly, including the light fixture.

With reference to FIG. 3, it may be seen that the third degree of freedom is obtained through a two-part mechanism of the boom assembly 4. The boom assembly 4 comprises an outer sleeve 35 and a rotatable inner rod 36 which is partially received within the sleeve 35 and which extends outward therefrom. The sleeve 35 is pivotally affixed to the U-bracket 8 by means of the pivot bolt 9. The rod 36 is rotatable. Said rotation is controlled through a friction plate and brake assembly as described above, where the rotational friction plate 12 is rigidly affixed to the rod 36 and the rotational brake assembly 13 is rigidly affixed to the outer sleeve 35. The rotation of the rod 36 must be limited to a total of less than 360° in order to prevent twisting of the power cord 19. Rotation of the rod 36 is limited to an amount less than 360° through the mechanism of a partial annular recess 45 on the rod 36. A travel stop screw 46 extends through the outer sleeve 35 and engages the partial annular recess 45. The rod 36 is freely rotatable when the travel stop screw 46 extends into the partial annular recess 45. However, since the partial annular recess 45 does not extend completely around the rod 36, rotation of the rod 36 is stopped before a total annular rotation of 360° can be reached.

The outward end of the rod 36 is provided with a light fixture pivot bracket 34 for attachment to the light fixture 5. The light fixture 5 may be pivoted around the bracket 34. The pivoting of the light fixture 5 is controlled through a friction plate 16 and brake assembly 17. The friction plate 16 is rigidly affixed to the light fixture 5 while the brake mechanism 17 is rigidly affixed to the rod 36.

Figure 4:
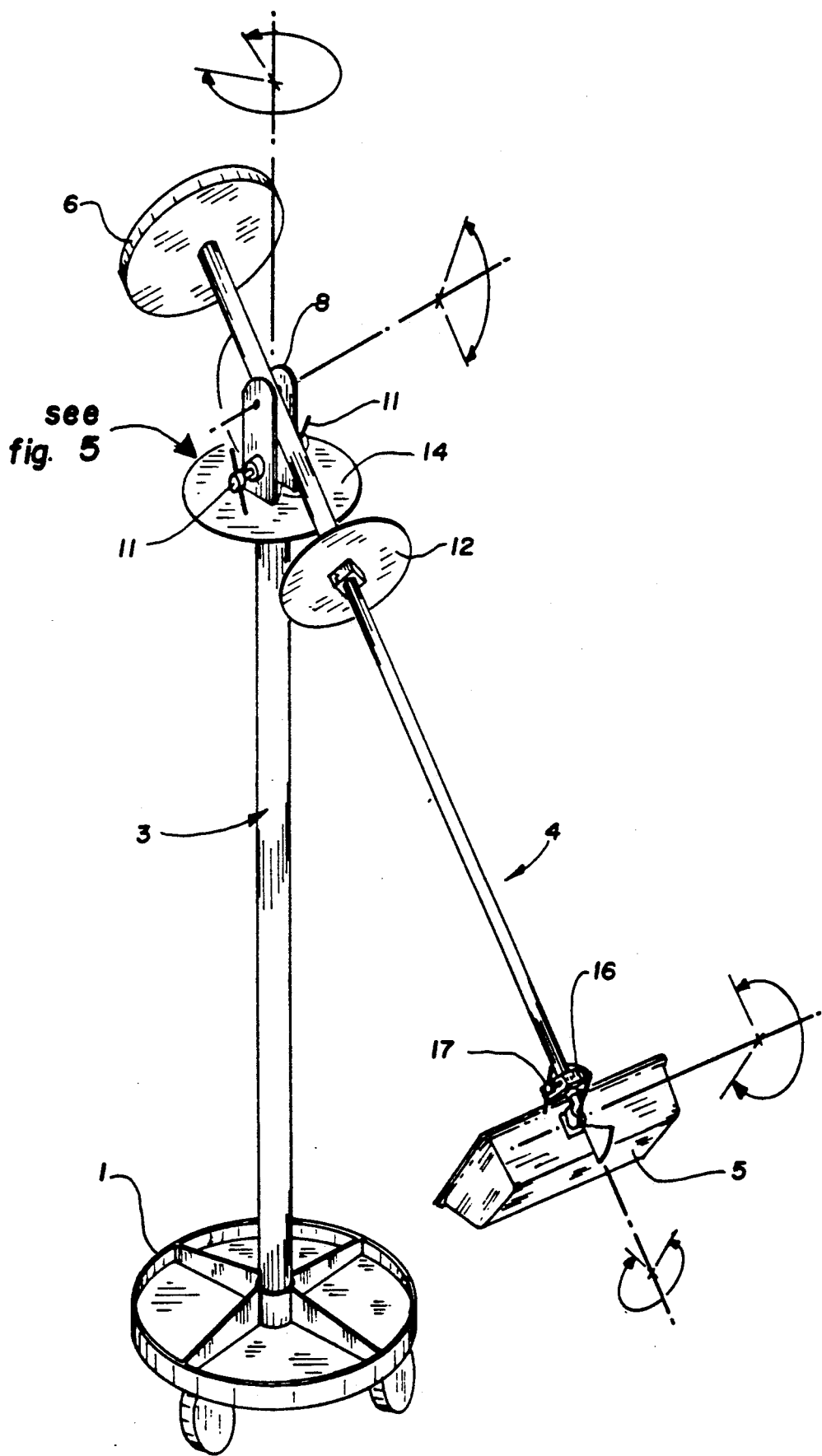
FIG. 4 is a simplified perspective view of the overall invention illustrating the degrees of freedom in orientation of the light fixture.

As shown in FIG. 4, the present invention provides four separate degrees of freedom in orienting the position of the light fixture 5. The boom assembly 4 may be pivoted vertically about the U-bracket 8. The boom assembly 4 may also be rotated about the vertical longitudinal axis of the stand 3. In addition, the light fixture may be rotated about the longitudinal axis of the boom assembly 4. Finally, the light fixture may be pivoted about the pivot bracket 34 on the outward end of the boom assembly 4.

Figure 5:
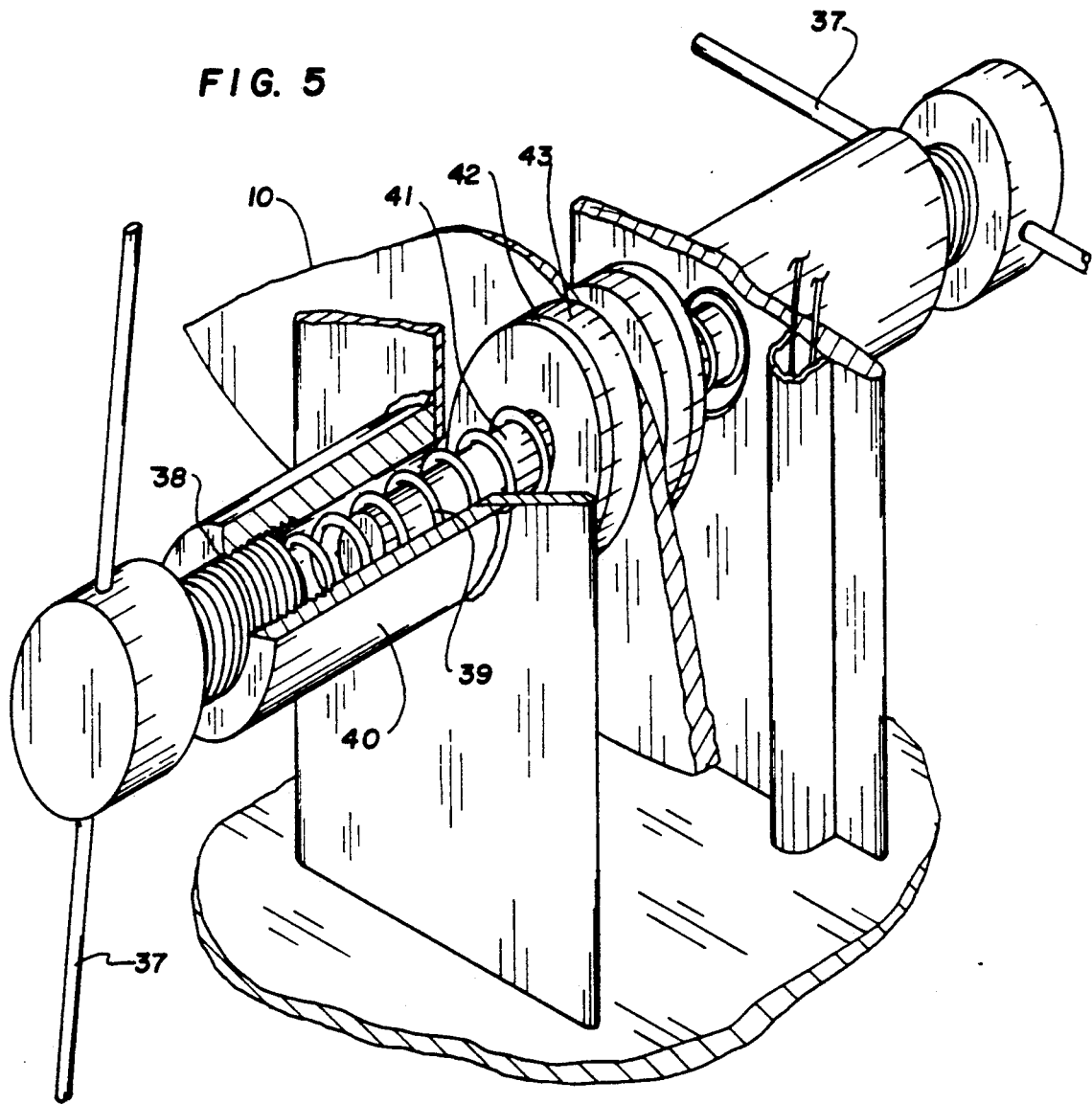
FIG. 5 is a cutaway view of the braking mechanism.

FIG. 5 illustrates the operation of the various brake assemblies employed on the invention. The particular detail shown in FIG. 5 is that of the vertical brake assembly 11. However, the mechanism of all the brake assemblies is identical.

A cylinder 40 is partially threaded on its inner surface. A biasing screw 38 engages the threads on the inner surface of the cylinder 40. In the preferred embodiment, a T-bar 37 attached to the head of the screw 38 provides means for manually adjusting the depth of penetration of the screw 38 into the cylinder 40. A piston 41 is slidably mounted within the cylinder 40. A biasing spring 39 is provided between the screw 38 and the piston 41. The piston 41 is provided with a disc 42 mounted on the end of the piston 41 extending outward of the cylinder 40. The disc 42 provides a mounting surface for a brake pad 43. The brake pad 43 may be composed of any of the class of materials suitable for producing a frictional effect when forced into contact with a solid surface. In operation, the brake pad 43 is forced into contact with a friction plate 10, 12, 14 or 16. The amount of pressure may be manually adjusted so that the friction plate may be moved relative to the braking assembly under moderate pressure and once such pressure is removed the friction plate is held motionless relative to the braking mechanism. The presence of the biasing spring 39 assures firm and consistent contact between the brake pad 43 and the friction plate 10, 12, 14 or 16. It is to be understood that various modifications to the preferred embodiment of the invention as described herein would be readily apparent to those skilled in the art and that the disclosure herein is in no way meant to limit the scope of the invention as embodied in the following claims.

What is claimed is:

1. A mobile shop light comprising
   (a) A base having means to provide mobility;
   (b) A stand vertically attached to said base;
   (c) A boom assembly comprising an arm, a light fixture attached to one end of said arm and a counterweight attached to an opposite end of said arm; and
   (d) Attaching means connected to an upper end of said stand which attach said stand to said boom assembly, said attaching means allowing said boom assembly to rotate in a horizontal plane, to rotate in a vertical plane, and to be positioned firmly at various angles with respect to said stand, said attaching means comprising
      (i) A bearing sleeve nested within the upper end of said stand and rotatable with respect thereto,
      (ii) A U-bracket rigidly attached to said bearing sleeve and rotatably attached to said boom assembly,
      (iii) A transverse friction plate rigidly attached to said bearing sleeve in a horizontal plane,
      (iv) Transverse braking means rigidly attached to the upper end of said stand such that a braking action may be applied to said transverse friction plate allowing the relative rotation between said stand and said boom assembly to be arrested,
      (v) A vertical friction plate rigidly attached to said boom assembly, and
      (vi) Vertical braking means rigidly attached to said U-bracket such that a braking action may be applied to said vertical friction plate allowing the relative rotation between said U-bracket and said boom assembly to be arrested;
   (e) Said arm of said boom assembly further comprising an outer sleeve pivotally affixed to said U-bracket such that said outer sleeve is vertically rotatable with respect to said U-bracket, said outer sleeve being sized to receive a portion of an inner rod which is rotatable about a longitudinal axis of said outer sleeve and which extends outward of said outer sleeve, and said light fixture is pivotally attached to an outward end of said fixture is pivotally attached to an outward end of said inner rod;
   (f) Said mobile shop light further comprising a rotational friction plate rigidly attached to said inner rod, rotational braking means rigidly attached to said outer sleeve such that a braking action may be applied to said rotational friction plate allowing the relative rotation between said outer sleeve and said inner rod to be arrested, a light fixture pivot friction plate rigidly attached to said light fixture, and a light fixture pivot braking means rigidly affixed to said inner rod such that a braking action may be applied to said light fixture pivot friction plate allowing the relative rotation between said light fixture and said inner rod to be arrested;
   (g) Each said braking means comprising:
      (i) A cylinder having a partially threaded inner surface,
      (ii) A biasing screw engaging said threads and having means for manually adjusting the depth of penetration of said screw into said cylinder,
      (iii) A piston slidably within said cylinder having a bearing surface disposed toward said biasing screw and a disc disposed outward of said cylinder,
      (iv) A biasing spring disposed within said cylinder between said biasing screw and said bearing surface of said piston, and
      (v) A braking pad rigidly affixed to said disc and composed of any of the class of materials suitable for producing a frictional effect when forced into contact with a solid surface.

2. A mobile shop light as set forth in claim 1 wherein said base further comprises a raised rim.

3. A mobile shop light as set forth in claim 1 further comprising a parts tray.

4. A mobile shop light as set forth in claim 1 further comprising an auxiliary electrical outlet.

* * * * *